UNITED STATES PATENT OFFICE.

MAX ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE VAT DYES AND PROCESS OF MAKING THEM.

1,032,216.     Specification of Letters Patent.     Patented July 9, 1912.

No Drawing.     Application filed March 30, 1912. Serial No. 687,512.

*To all whom it may concern:*

Be it known that I, MAX ISLER, citizen of the Swiss Republic, residing at Mannheim, Germany, have invented new and useful Improvements in Anthraquinone Vat Dyes and Processes of Making Them, of which the following is a specification.

My invention relates to new vat dyes of the anthraquinone series which are regarded as containing two anthraquinone residues joined together by means of one nitrogen atom and one sulfur atom. The simplest member of the group probably possesses a constitution corresponding to the formula

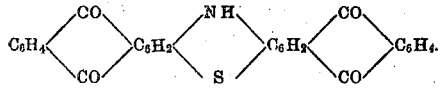

I can produce my new dyes by reacting on 1-halogen-anthraquinone or on a derivative thereof, as hereinafter defined, with an anthraquinone compound which contains in the positions 1 and 2 one mercapto group and one amino group. Identical, or similar, compounds can be obtained by employing, instead of 1-halogen-anthraquinone, the corresponding 1.2-dihalogen-anthraquinone or a derivative thereof which is substituted in position 2 by another group, such for instance as the methoxy, or the carboxy, or the aldehyde, or the amino group, since in this case such group is split off and the nitrogen, or sulfur, atom of the mercapto-amino-anthraquinone enters the said position 2. Identical, or similar, compounds can also be obtained by acting with a 1-mercapto-anthraquinone on an ortho-halogen-amino-anthraquinone.

My new dyes are characterized by being obtainable in the form of violet-blue crystals and they yield green solutions in concentrated sulfuric acid, from yellow to brown vats with alkaline hydrosulfite, and dye cotton from violet to blue shades of excellent fastness.

The following examples will serve to illustrate further the nature of my invention and how it can be carried into practical effect, but the invention is not confined to these examples. The parts are by weight.

Example 1: Boil together 20 parts of the potassium salt of 2-amino-anthraquinone-1-mercaptan, 15 parts of 1.2-dichlor-anthraquinone and from 200 to 400 parts of nitrobenzene or of naphthalene. When it is ascertained from a test portion that no further formation of coloring matter is taking place, filter off the condensation product and wash it with alcohol. It consists of violet-blue glittering crystals which are extremely difficultly soluble in most of the usual organic solvents. It can be re-crystallized from boiling nitrobenzene. It is insoluble in caustic soda solution, but yields a green solution in concentrated sulfuric acid. With alkaline hydrosulfite it forms a yellow-brown vat which dyes cotton fast violet-blue shades. In a similar manner, derivatives of 2-amino-anthraquinone-1-mercaptan, or of 1.2-dichlor-anthraquinone can be converted into coloring matters.

Example 2: Boil together 30 parts of the sodium salt of 2-amino-anthraquinone-1-mercaptan, 25 parts of 1-chlor-anthraquinone and from 300 to 600 parts of nitrobenzene. When the formation of the coloring matter is complete, filter it off and remove any adhering nitrobenzene, whereupon the coloring matter is obtained in a pure state. In this example, pyridin or naphthalene may be employed instead of nitrobenzene. A similar procedure can be employed in order to produce coloring matters from 1-chlor-anthraquinone-2-carboxylic acid, or from 1-chlor-2-amino-anthraquinone, or from 1-chlor-anthraquinone-2-aldehyde, or from 1-chlor-2-methoxy-3-methyl-anthraquinone, instead of from 1-chlor-anthraquinone.

Example 3: Boil together 20 parts of 1-chlor-2-amino-anthraquinone and 20 parts of the sodium salt of anthraquinone-1-mercaptan and 200 to 400 parts of nitrobenzene (preferably with the addition of from 10 to 20 parts of potassium carbonate) until the formation of the coloring matter is complete, and then isolate it in the usual manner. It dyes cotton, from the vat, violet-blue shades. In this example, the 1-chlor-2-amino-anthraquinone can be replaced by other ortho-halogen-amino-anthraquinones for instance the coloring matter prepared from 1.3-dibrom-2-amino-anthraquinone dyes cotton, from a vat, violet-blue shades.

Now what I claim is:—

1. The process of producing vat dyes of the anthraquinone series by reacting on a 1-halogen-anthraquinone body with an anthraquinone compound which contains in the positions 1 and 2 one mercapto group and one amino group.

2. The process of producing vat dyes of the anthraquinone series by reacting on anthraquinone-1-mercaptan with an ortho-halogen-amino-anthraquinone.

3. The process of producing a vat dye of the anthraquinone series by reacting on 2-amino-anthraquinone-1-mercaptan with 1-chlor-anthraquinone.

4. The new vat dyes of the anthraquinone series which can be obtained by reacting on a 1-halogen-anthraquinone body with an anthraquinone compound which contains in the positions 1 and 2 one mercapto group and one amino group, which new compounds probably contain two anthraquinone residues joined together by one nitrogen atom and one sulfur atom and which can be obtained in the form of violet-blue crystals which yield green solutions in concentrated sulfuric acid, which give from yellow to brown vats with alkaline hydrosulfite and dye cotton from violet to blue shades of excellent fastness.

5. The new vat dye which can be obtained by condensing 2-amino-anthraquinone-1-mercaptan with 1-chlor-anthraquinone and probably possesses a constitution corresponding to the formula

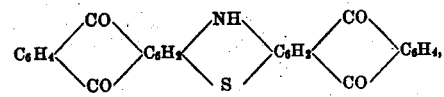

which dye can be obtained in the form of violet-blue crystals which give a green solution in concentrated sulfuric acid, a yellowish brown vat with alkaline hydrosulfite and dyes cotton violet-blue shades of excellent fastness.

In testimony whereof I have hereunto set my hand in the presence of two subscribing witnesses.

MAX ISLER.

Witnesses:
J. ALFC. LLOYD,
JOS. PEIFFER.